Aug. 14, 1928.

A. L. EICHER 1,680,328

BY-PASS LUBRICATOR

Filed Feb. 12, 1927

Inventor

A. L. Eicher

By Frease and Bond
Attorneys

Patented Aug. 14, 1928.

1,680,328

UNITED STATES PATENT OFFICE.

ALBERT L. EICHER, OF CANAL FULTON, OHIO.

BY-PASS LUBRICATOR.

Application filed February 12, 1927. Serial No. 167,673.

The invention relates to by-pass lubricators for friction contact members such as, shafts, gears, worms and the like, and more particularly for the high speed worms used in the worm gear drives of automobiles, and usually encased in the rear axle housings.

In such automobile worm gear drives, the worm is frequently below the gear wheel which it drives. In such a case when the engine is not running and the worm consequently not rotating, a suitable lubricant completely submerges the worm in its housing, and partially submerges the wheel which meshes with the worm.

Gravitation has been depended upon to properly lubricate the friction contacts of the worm and wheel, but at the high speeds at which the worm may rotate, which may be as high as 3500 R. P. M., it has been found that to drive the automobile forward, the worm has a propeller action upon the lubricant, throwing the same centrifugally outward from the worm and piling it up backward to the rear of the worm housing, setting up a region of high pressure in the back of the housing, and a region of low pressure in the front thereof. Reverse conditions exist when the worm is rotating to drive the automobile backward.

Consequently the higher the speed of rotation of the worm, the greater the danger that the worm will be improperly lubricated, and in fact there is a danger that at very high speeds, the worm will receive no lubrication whatever even though, as aforesaid, there may be sufficient lubricant in the housing to totally submerge the worm and partially submerge the wheel when the same are not rotating and the automobile is standing still.

Accordingly, the objects of the present improvements are to provide a by-pass in one or more of the structural parts whereby the worm may be properly lubricated at all speeds, and whatever the direction of rotation thereof, and to provide structural means for more positively lubricating the worm under its normal running conditions of driving the automobile forward.

These and ancillary objects are attained in the present improvements by a construction and arrangement hereinafter set forth in detail and which may be described in general terms as including one or more by-passes adjacent to or incorporated in the worm, whereby the lubricant may flow from the region of high pressure in the housing to the region of low pressure, which low pressure region is usually in front of and adjacent to the location of the friction contact surfaces of the worm and wheel.

Figure 1:
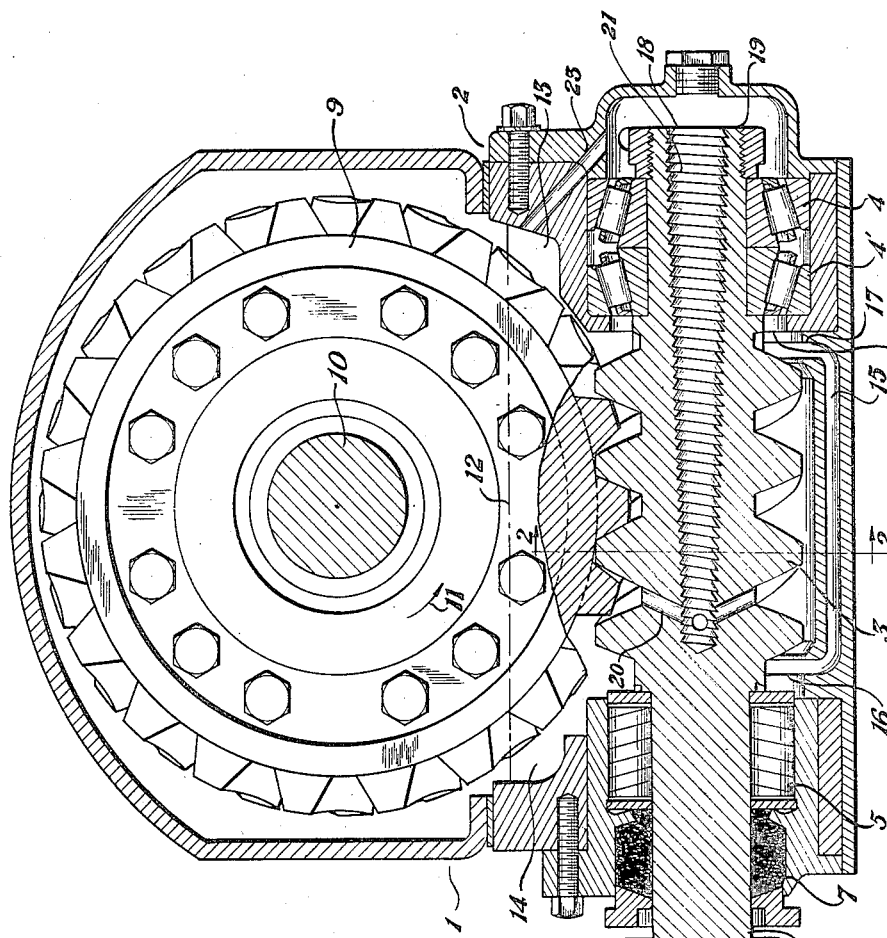
Figure 2:
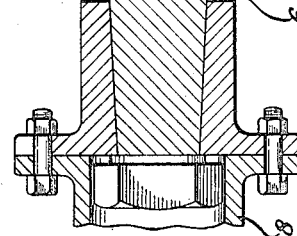

A preferred embodiment of the improvements is illustrated in the accompanying drawing forming part hereof, in which Figure 1 is a cross sectional view longitudinal of the worm axis illustrating the improved by-pass lubricator applied to the worm of a worm gear drive in an automobile rear axle; and Fig. 2, a fragmentary sectional view thereof, as on line 2—2, Fig. 1.

Similar numerals refer to similar parts throughout the drawing.

The improved by-pass lubricator as applied to the worm gear drive of an automobile rear axle illustrated generally at 1, includes a housing member 2 forming a receptacle for containing a lubricant in which a worm 3 is operatively mounted in a usual manner as in rear anti-friction bearings 4 and 4' and front anti-friction bearing 5.

The forward end of the worm shaft 6 extends out of the housing through suitable packing 7 and is secured to the rear end of a drive shaft 8 which is rotated in a usual manner by the automobile engine and transmission gearing, not shown.

The worm 3 meshes with a gear wheel 9 mounted in the usual manner upon a shaft 10 for driving the automobile rear wheels.

In the normal operation of the automobile for driving forward, the worm 3 is rotated clockwise when viewed axially from its forward end to drive the wheel 9 in the counter clockwise direction indicated by the arrow 11.

In order to lubricate the friction contact surfaces of the worm and wheel, it has been usual to fill the receptacle formed by the housing with a lubricant, so that, when the worm and wheel are at rest, the normal static body of the lubricant completely submerges the worm and partially submerges the wheel, as indicated by the dash and dot line 12 which may be the upper level of the lubricant in the housing.

When the friction contact members, the worm 3 and the wheel 9, are submerged in the lubricant in the housing 2 as aforesaid, and when the improvements of the present invention are not applied, it has been found, particularly at high speeds of rotation of the worm, that the lubricant is thrown centrifugally outward and rearward by the propeller action of the worm threads and the rotation of the worm wheel, so as to pile up in the rear of the housing, when the automobile is being driven forward, creating a region of high pressure at the rear end 13 of the housing and a region of low pressure at the forward end 14 thereof, and exposing the friction contact surfaces of the worm and wheel, which permits them to become overheated.

When the automobile is being driven backward, reverse conditions exist in the housing, and a region of high pressure is set up in the forward end 14, and a region of low pressure is set up in the rear end 13, thereof.

A by-pass channel 15 having an opening 16 into the lubricant containing receptacle at the forward end of the worm of the gear, and an opening 17 into the lubricant containing receptacle at the rear end thereof, may be provided in the wall of the housing to form a passage-way for the lubricant from the region of high pressure to the region of low pressure in the lubricant in the receptacle, whatever may be the direction of rotation of the worm, and the propeller action of the worm threads forces the lubricant through this by-pass thus setting up a continual flow of lubricant about the worm and carrying away the air therefrom. Both by-pass openings 16 and 17 are located to be within the normal static body of the lubricant below the normal static level thereof, as indicated at 12.

The by-pass 15 in cooperation with the other elements of the mechanism, provides a way for the flow of lubricant from the high pressure region to the low pressure region in the housing and over the worm regardless of the direction of rotation thereof; the higher pressure produced in one region being sometimes sufficient to cause a flow of the lubricant through the by-pass into the lower pressure region within the housing directly to the initial place of friction contact.

The worm however, is rotated to drive the automobile forward for a greater portion of the time, and for directly delivering a very large volume of lubricant to the friction contact surfaces of the worm and wheel, while the automobile is being driven forward, the worm shaft itself may be provided with a preferably tapered axial by-pass 18 therein leading from the rear end 19 thereof to a point within the forward end of the worm threads, and communicating therewith through a plurality of preferably angled radial ports 20.

For more positively conveying and forcing the lubricant through the by-pass 18 from the rear end of the housing and through the ports 20 to the friction contact surfaces of the worm and wheel, the axial by-pass 18 is preferably tapered and converged forward from the rear end 19, and is provided with internal serrate threads 21 oppositely pitched with reference to the worm threads. That is to say, as illustrated, the worm threads are left-handed and the internal threads 21 are right-handed, whereby rotation of the worm, clockwise when viewed from its forward end, causes the tapered and threaded by-pass 18 to act as a screw conveyor and positively forces lubricant to pass therethrough and to be delivered out of the ports 20 to the friction contact surface of the forward worm threads. All openings for the by-pass 18 are located to be within the normal static body of the lubricant below the normal static level thereof.

As illustrated, the annual openings 22 about the rear bearings 4 and 4' provide passage-way for lubricant from the lubricant receptacle in the housing around the rear end of the worm shaft to the by-pass 18, and additional ports 23 may be provided in the rear bearing walls of the housing for the same purpose.

The lubricating means, thus set forth in detail for the worm gearing which operates in the housing to create a region of high pressure in one portion of the housing, and a region of low pressure in another portion of the housing, positively cause a flow of lubricant over the friction contact surfaces of the gearing at all times, whereby danger of overheating is obviated, and the worm is at all times properly lubricated.

Moreover, by providing a plurality of ports 20 leading radially outward from the forward end of the axial by-pass 18 in the worm shaft, and especially by inclining said ports from a normal to a rearwardly inclined position, as shown in Fig. 1 of the drawings, there will be such a siphoning action set up by the operation of the worm gearing that the lubricant will be discharged more rapidly from said ports than when they are not so rearwardly inclined.

Such siphoning action is so great that it will sometimes convey the lubricant forward through the by-pass 18 more rapidly than the lubricant can flow through the ports 23 into the housing receptacle in rear of the worm shaft 6 and its rear bearings 4 and 4', as a result of which air pockets may be formed therein.

Under such circumstances, it is desirable if not necessary to use the by-pass 15 in the wall of the housing in conjunction with the by-pass 18 in the worm shaft 6, so that there will always be a full and free flow of lubricant through the by-pass 15 from the receptacle in front of the rear bearings 4 and 4' of the worm shaft; thus making a true combination between both of the by-passes illustrated and described herein.

I claim:

1. Lubricating means for friction contact members, such as worm gears and the like, including a housing member for containing a lubricant, gear members in the housing member operating to create a region of high pressure in the lubricant in one portion of the housing and a region of low pressure in the lubricant in another portion of the housing adjacent the initial place of friction contact between said gear members, there being a by-pass having one opening in said high pressure region and another opening in said low pressure region, so as to permit the lubricant to flow from the high pressure region through the by-pass to the low pressure region at the initial place of friction contact.

2. Lubricating means for friction contact members, such as worm gears and the like, including a housing member and gear members operatively mounted therein, the housing member forming a receptacle for containing a lubricant which is moved away from the friction contact surfaces of the gear members by operation of the same, there being a by-pass opening into the receptacle adjacent the initial place of friction contact and also opening into the receptacle at another place to where the lubricant is moved, whereby the lubricant is returned by the pressure caused by such movement, directly to said initial place of friction contact.

3. Lubricating means for friction contact members, such as worm gears and the like, including a housing member and gear members mounted therein, the housing member forming a receptacle for containing a lubricant which is moved away from the friction contact surfaces of the gear members by operation of the same, there being a by-pass in one of the members opening into the receptacle adjacent the initial place of friction contact and also opening into the receptacle at another place to which the lubricant is moved, whereby the lubricant is returned by the pressure caused by such movement, directly to said initial place of friction contact.

4. Lubricating means for friction contact members such as worm gears and the like including a housing member adapted for containing a lubricant, gear members operatively mounted in the housing with friction contact surfaces normally submerged by the lubricant when not in operation, which lubricant may be thrown away from such friction surfaces to another place in the housing by the operation of the gear members, there being a by-pass in one of the members opening at one end in said other place and at the other end adjacent the initial place of friction contact, said first named opening being below the normal static level of the lubricant, whereby the lubricant so thrown away may flow by the pressure caused thereby from said other place in the housing through said by-pass to said initial place of friction contact to lubricate the friction surfaces.

5. Lubricating means for friction contact members, such as worm gears and the like, including a housing and gear members operatively mounted therein, the housing being adapted for containing a lubricant which is moved away from the friction contact surfaces of the gear members by operation of the same, there being a by-pass in one gear member having an opening adjacent the initial place of friction contact and another opening spaced therefrom at another place to which the lubricant is moved, whereby the lubricant is returned by the pressure caused by such movement, through the by-pass, directly to such initial place of friction contact.

6. Lubricating means for friction contact members such as worm gears and the like, including a housing and gear members operatively mounted therein, the housing being adapted for containing a lubricant which is moved away from the friction contact surfaces of the gear members by operation of the same, there being a by-pass in one gear member having an opening adjacent the initial place of friction contact and another opening spaced therefrom at a place to which the lubricant is moved, whereby the lubricant is returned by the pressure caused by such movement, through the by-pass, directly to such initial place of friction contact, there being means in the one gear member for increasing the flow of lubricant through the by-pass.

7. Lubricating means for friction contact members, such as worm gears and the like, including a housing and gear members operatively mounted therein, the housing being adapted for containing a lubricant which is moved away from the friction contact surfaces of the gear members by operation of the same, there being a tapered by-pass in one gear member having an opening adjacent the initial place of friction contact and another opening spaced therefrom at a place to which the lubricant is moved, whereby the lubricant is returned by the pressure caused by such movement, through the by-pass, directly to such initial place of friction contact.

8. Lubricating means for friction contact members, such as worm gears and the like, including a housing and gear members operatively mounted therein, the housing being adapted for containing a lubricant which is moved away from the friction contact surfaces of the gear members by operation of the same, there being a by-pass in one gear member having an opening adjacent the inital place of friction contact and another opening spaced therefrom at a place to which the lubricant is moved, whereby the lubricant is returned by the pressure caused by such movement, through the by-pass, directly to such initial place of friction contact, there being screw conveyor means in the by-pass for increasing the flow of lubricant through the same.

9. Lubricating means for friction contact members, such as worm gears and the like, including a housing and gear members operatively mounted therein, the housing being adapted for containing a lubricant which is moved away from the friction contact surfaces of the gear members by operation of the same, there being a tapered by-pass in one gear member having an opening adjacent the initial place of friction contact and another opening spaced therefrom at a place to which the lubricant is moved, whereby the lubricant is returned by the pressure caused by such movement, through the by-pass, directly to such initial place of friction contact, there being screw conveyor means in the by-pass for increasing the flow of lubricant through the same.

10. Lubricating means for friction contact members, such as worm gears and the like, including a housing and gear members operatively mounted therein, the housing being adapted for containing a lubricant which is moved away from the friction contact surfaces of the gear members by operation of the same, there being an axial by-pass in one gear member having rearwardly inclined radial ports in its forward end opening adjacent the initial place of friction contact and having another opening at its rear end whereby the lubricant is conveyed through the axial by-pass from the rear end thereof and is discharged from the ports at the front end thereof directly to the initial place of friction contact.

11. Lubricating means for friction contact members, such as worm gears and the like, including a housing and gear members mounted therein, the housing member forming a receptacle for containing a lubricant which is moved away from the friction contact surfaces of the gear members by operation of the same, there being a by-pass in the housing member opening into the receptacle adjacent the initial place of friction contact and also opening into the receptacle at another place to which the lubricant is moved whereby the lubricant is returned by the pressure caused by movement, directly to the initial place of friction contact, and there being an axial by-pass in one of the gear members having an opening adjacent the initial place of friction contact and another opening spaced therefrom at another place to which the lubricant is moved, there being means in said axial by-pass causing the flow of lubricant through the same and discharging it directly to the initial place of friction contact.

In testimony that I claim the above, I have hereunto subscribed my name.

ALBERT L. EICHER.